June 21, 1949.  J. E. STORMENT  2,473,737

LEVEL CONTROL IN PACKED TOWERS

Filed March 18, 1944

INVENTOR
J. E. STORMENT
BY
Hudson, Young + Younger
ATTORNEYS

Patented June 21, 1949

2,473,737

UNITED STATES PATENT OFFICE 2,473,737

LEVEL CONTROL IN PACKED TOWERS

Joseph E. Storment, Bartlesville, Okla., assignor to Phillips Petroleum Company, a corporation of Delaware Application March 18, 1944, Serial No. 527,121

10 Claims. (Cl. 202—72)

This invention relates to methods of and apparatus for controlling the liquid level in a tower or other chamber in which evaporation is taking place. It has particular relation to the control of the liquid level in a packed tower or reactor chamber wherein fractionation, catalytic action, stripping or various chemical reactions may occur.

In my copending application Serial No. 575,507, filed January 31, 1945, for Liquid level control, I have disclosed and claimed a different type of apparatus and a different process for carrying out the same type of liquid level control in a very similar evaporating chamber. In that application a superheated vapor is introduced to control the liquid level and arrest the rise of said liquid level. The superheated vapor enters above the desired level of the liquid.

In the prior art, attempts have been made to control the fluid level in a packed tower or column by controlling the temperature of the entering liquid feed stock. There is such a large lag between the time the heated fluid stock enters the bottom of the column until its addition is effective at the top of the column that this method causes the fluid level in the packed column to vary considerably. If this method is used, the amount and quality of the vapor which leaves the tower and enters a fractionating tower (not shown) may vary considerably causing the operation of the fractionating tower to be difficult to control.

One object of the invention is to provide a method and apparatus for keeping the level in a packed tower constant and also keeping the quality and the rate of effluent vapors leaving the packed tower uniform.

Another object of this invention is to provide a method of controlling the liquid level in packed and in unpacked towers.

Another object of the invention is to provide an apparatus for controlling the liquid level in packed and unpacked towers.

Another object is to provide a method of and apparatus for keeping the quality and the rate of flow of effluent vapors leaving the tower uniform.

Another object is to control the level in a tower by addition of either vapor or liquid to the upper surface of the liquid already in the tower, whereby increased or decreased evaporation restores the correct level of the liquid without delay.

A further object of the invention is to provide simple, fool-proof, inexpensive means for carrying out the above objects.

Numerous other objects and advantages will be obvious to those skilled in the art upon reading the accompanying specification, claims and drawings.

Figure 1:
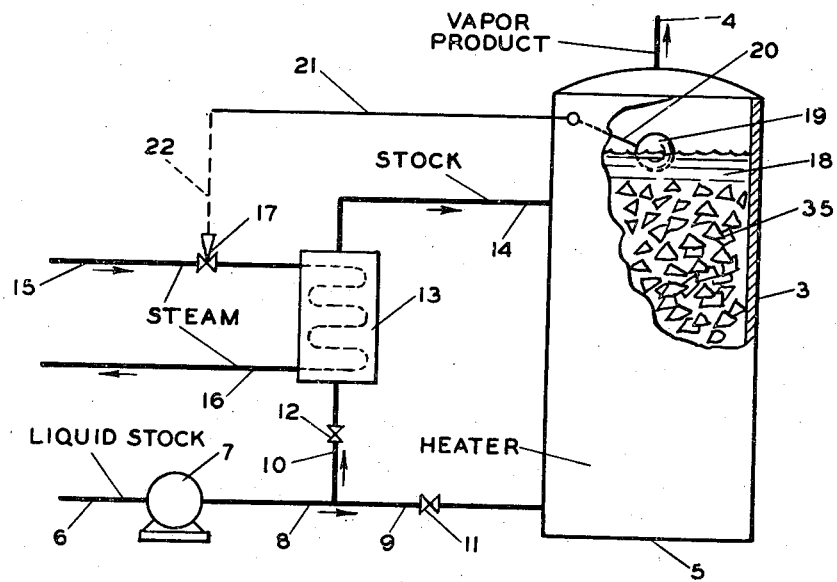
Figure 1 is an elevational diagrammatic view of a packed evaporating tower equipped with an illustrative embodiment of the invention.

In Figure 1 a tower or evaporating chamber 3 is provided with an outlet consisting of a vapor product line 4. Line 4 may lead to a fractionation tower (not shown) or any other chemical or physical apparatus requiring a more or less uniform supply, or line 4 may be the final product line. While the uniformity of the product from chamber 3 is an advantageous feature, the invention does not depend on the type of product as the top of chamber 3 could be opened to the atmosphere and the product dissipated into the atmosphere for some useful purpose, such as a smoke screen, without effecting the operation of the invention.

Chamber 3 contains in its lower portion 5 a heater (not shown) of any type known to the art which may be electrical, steam, or any other type of heater. Or the bottom of chamber 3 may be heated by an open flame or any other suitable heating means. The liquid may have such a vapor pressure under the conditions prevailing inside of chamber 3 that no heater may be necessary, and in fact instead of a heater being applied at 5, with certain liquids the apparatus may be constructed without any heater or with cooling coils throughout its lower portion 5 and still practice the invention.

Liquid stock to be evaporated in chamber 3 enters the system through liquid stock line 6 and, if necessary may be pumped by pump 7 through liquid stock line 8. Line 8 has two branches 9 and 10.

Branch 9 leads to a lower portion of chamber 3 and the flow in line 9 is controlled by a valve 11. Valve 11 may be set to allow the proper rate of flow therethrough.

Line 10 is provided with a similar valve 12 to control the rate of flow therein and by setting valves 11 and 12 the proportions of the liquid stock flowing through lines 9 and 10 may be varied throughout the entire possible range by infinitesimal degrees.

Line 10 after passing through valve 12 enters a heater or heat exchanger 13. While line 10 is shown as expanding to the full size of heater 13 it is not intended that any particular heater or heat exchanger be employed, as any heater old in the art that can be controlled as to its temperature may be substituted in practicing the invention.

From heater 13 the stock passes through line 14 (which is an extension of line 10) into tower 3 at a level higher than the point of entry of line 9, the level of entry of line 14 being preferably adjacent the level at which it is desired to maintain the liquid at inside of chamber 3, the reason for which being explained in the operation of the device.

While any controllable heating means may be employed, I have shown a steam supply line 15 leading to heater 13 and a steam exhaust line 16 leading away from 13, and as customary with steam lines the exhaust is preferably lower than the supply line so that water of condensation may leave the system through line 16. By having the steam pass in countercurrent flow to the liquid stock in heater 13, a higher temperature may be obtained in the stock in line 14 for any set temperature of steam in line 15.

The flow of steam from supply line 15 to heater 13 is controlled by valve 17. Floating in the liquid 18 in tower 3 is a float 19. The shape of float 19 is immaterial. Float 19 is connected by a level arm 20, or other suitable mechanical linkage to a transmission means 21. Transmission means 21 may be a rod rotated by lever arm 20 as float 19 moves up and down, but the invention is not limited to the specific lever arm 20 nor transmission means 21, as any transmission means, either mechanical, electrical or working on any principle known to the art may be substituted for the transmission means 20, 21 shown and the invention will still be practiced.

Transmission means 21 is connected by any suitable linkage 22 to valve 17 to control the position of the valve. When float 19 is high valve 17 is open, and when float 19 is low valve 17 is closed, the valve taking intermediate positions in response to intermediate positions of the float. Obviously, any known control means between the float and the valve may be employed in practicing the invention.

Figure 2:
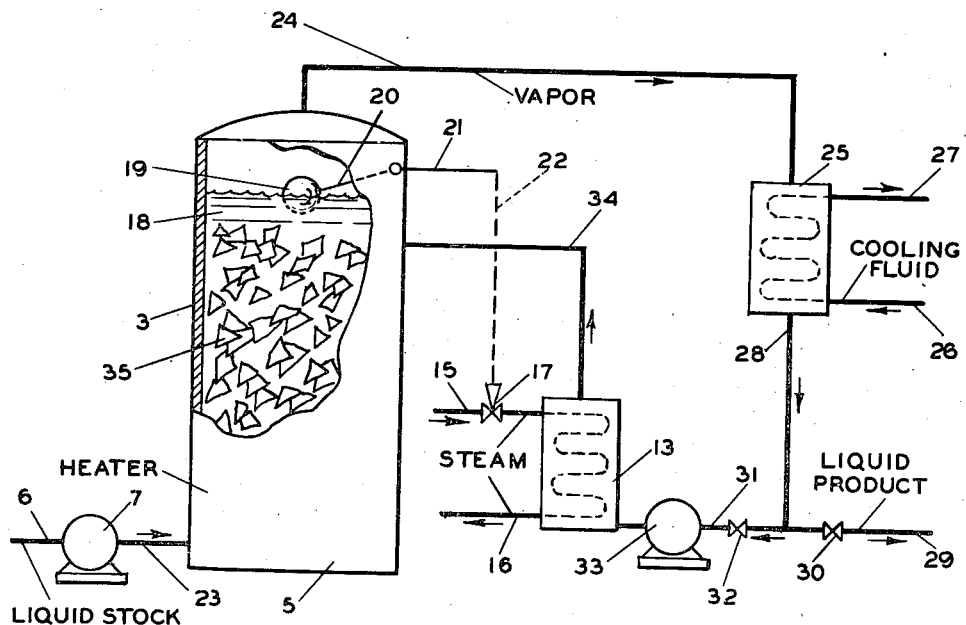
Figure 2 is a view similar to that of Figure 1 of a modified form of the invention.

In Figure 2 is shown a modification in which like parts have been given the same numerals as in Figure 1. In Figure 2 the liquid stock from supply line 6 may be pumped by pump 7 if necessary through line 23 into chamber 3. Chamber 3 is heated by heater 5 and contains a float 19 and its operating lever 20 as in Figure 1. The vapor formed in chamber 3 passes out through a different type of vapor product line 24 which leads to a condenser 25 of any suitable type in which cooling fluid coming in pipe 26 and flowing out pipe 27 is passed in indirect heat exchange with the vapor to condense it. Countercurrent flow is preferably maintained in heat exchanger 25 in order that the condensed liquid emerging through line 28 may be as cool as a certain temperature of cooling fluid in line 26 can make it.

The condensed vapor coming down line 28 is mainly taken off through line 29 controlled by valve 30 as a liquid product. Some of the condensed liquid passes through reflux line 31 controlled by valve 32. The relative amounts of liquid passing through lines 31 and 29 can be regulated through the entire range by adjusting valves 30 and 32.

The condensed liquid in line 31 may be aided in its flow by pump 33 and passes through heater 13 and a reflux line 34 into an upper portion of chamber 3. The operation of parts 13, 15, 16, 17, 19, 20, 21 and 22 being the same as in Figure 1 it is not believed necessary to further describe them.

In both Figures 1 and 2 it is often desirable to pack tower 3 with granular packing material 35. Granular packing material 35 may be of any size depending entirely upon what type of operation is being carried on in tower 3 and may be a catalyst or merely inert packing. The packing 35 may be employed to provide closer fractionation, stripping, or chemical reactions including catalytic actions or physical rearrangements. Packing 35 is necessitated by whatever process is being employed that requires it, and so far as the present invention is concerned merely acts to aggravate the problem of controlling the liquid level in the tower, and in this way it forms a combination with the liquid level control because other methods of liquid level control known to the prior art become inoperative when applied to a packed tower. This is because of the lag in time between the making of an adjustment in the heating of the tower and the time when the surface of liquid 18 begins to increase in evaporation. This long time lag caused by the long bed of boiling liquid results in surging during which packing 35, which may be of a nature requiring constant submergence, is exposed to vapors in the top of tower 3, or, which is probably worse, solid slugs of liquid 18 may pass through vapor product lines 4 or 24 with disastrous results to the fractionation or other process being effected by the apparatus shown in the drawings or by further apparatus connected thereto and not shown.

While tower 3 has been shown as having a single vapor product outlet 4 or 24, obviously a number of such outlets may be located at spaced points in the upper portion of the tower, and while packing material 35 has been shown as granular material such as broken stone it is obvious that some form of baffle plate, or bubble tray, or a series of such might be substituted for material 35. In such modifications where there are a plurality of vapor product lines in the upper portion of the tower granular material such as 35 or the baffles or bubble trays mentioned may be placed in the upper part of tower 3 between the various vapor product lines without departing from the invention, it being obvious that as long as space is provided for float 19 to be moved up and down through a suitable range above and below the desired level of liquid 18 in tower 3 that the present invention will still be practiced.

*Operation*

In Figure 1 the liquid stock to be evaporated comes in line 6 and is pumped by pump 7 through lines 9 and 10 into chamber 3. The amount that passes through lines 9 and 10 respectively is controlled by adjusting valves 11 and 12. Heat is applied, at 5 for example, to chamber 3 causing evaporation of liquid stock 18 therein and the vapor passes out through line 4. Float 19 floats on the surface of liquid 18.

If the amount of liquid stock being pumped in through lines 10, 14 and 9 is chosen so that a little more liquid is being supplied than heater 5 will evaporate, then float 19 will rise and move lever 20 and linkage 21, 22 to open valve 17. Hot steam from supply line 15 then passes through heater 13 heating up that portion of the liquid stock that pump 7 is forcing through lines 10 and 14. As hot liquid or vapor is now being pumped in at 14 the amount of heat added to liquid 18 is raised, and as the pressure conditions in the top of 3 are assumed to be the same the increased heat causes increased evaporation.

As the increased evaporation carries the vaporized liquid out line 4 faster than the liquid is entering chamber 3, the liquid level of liquid 18 falls and float 19 falls with it. This moves lever 20 and linkage 21, 22 to close valve 17, shutting off the steam and allowing heater 13 to cool. The stock in line 14 not being so hot, it does not add as much heat to liquid 18 as formerly and the amount of vapor caused by evaporation is reduced. As less liquid is being evaporated than is entering chamber 3, the liquid level rises inside chamber 3. This has been described as though it were a hunting operation, but such is not the case in practice as any float 19, known to the prior art, will take a position and maintain it with little change, maintaining the level of liquid 18 at substantially the desired level, and the opening and closing movements of valve 17 will generally be so small and so slowly executed as to hardly be noticeable.

The operation of Figure 2 is similar except that instead of splitting the liquid stock in pipe 6 as in Figure 1, it is all forced into chamber 3 through pipe 23. The vapor passing through line 24 is condensed in condenser 25 by heat exchange with cooling fluid in line 26.

The condensed liquid in line 28 is then heated in heater 13 in a manner similar to Figure 1, and the same sequence of operations occurs.

When the level of liquid 18 is too high, float 19 opens valve 17 allowing steam to pass through heater 13 and causing the reflux in line 34 to be hotter. In turn, this hotter liquid causes increased evaporation and thereby lowering of liquid 18 and float 19.

Float 19 closes valve 17 and heater 13 cools down. Thus it will be seen that the operation is similar to that in Figure 1 and that in actual operation substantially no hunting action occurs.

It should be understood throughout the application that the material going to the top of the tower may range from a sub-cooled liquid to a super-heated vapor, depending on the amount of heat being supplied to the heater on this control stream which in turn depends on the location of the liquid level in the tower. In Figure 2 cooler 25 may sub-cool liquid for line 31 and when heater 13 is off sub-cooled liquid enters tower 5 through line 34. When heater 13 is on full this liquid may be turned to super-heated vapor. In Figure 1 a cooler similar to 25 may be placed in line 10 for similar results.

Various changes in design, construction and proportion of parts may obviously be made without departing from my invention, the scope of which is defined only by the following claims.

Having described my invention, I claim:

1. Apparatus of the class described comprising in combination an evaporating tower having an outlet for vapor, means to heat said tower, a liquid stock supply line, pumping means in the liquid stock supply line, said supply line having two branches, a valve in each branch controlling flow therethrough, one of said branches communicating with said tower at a lower level, the second of said branches communicating with said tower at a higher level, packing material in said tower extending between said lower and higher levels, a heater in the second of said branches, a steam supply line communicating with said heater, a valve in said steam supply line controlling flow therethrough, a float in said evaporating tower disposed to float at substantially the liquid level from a level lower than to a level higher than a desired liquid level, and transmission means between said valve in said steam supply line and said float disposed so that movement of said float upwardly opens said valve in said steam line whereby the liquid level in said tower will be maintained substantially at said desired level by evaporation.

2. Apparatus of the class described comprising in combination an evaporating tower having an outlet for vapor, means to heat said tower, a liquid stock supply line, said supply line having two branches, a valve in each branch controlling flow therethrough, one of said branches communicating with said tower at a lower level, the second of said branches communicating with said tower at a higher level, packing material in said tower extending between said lower and higher levels, a heater in the second of said branches, a steam supply line communicating with said heater, a valve in said steam supply line controlling flow therethrough, a float in said evaporating tower disposed to float at substantially the liquid level from a level lower than to a level higher than a desired liquid level, and transmission means between said valve in said steam supply line and said float disposed so that movement of said float upwardly opens said valve in said steam line whereby the liquid level in said tower will be maintained substantially at said desired level by evaporation.

3. Apparatus of the class described comprising in combination an evaporating tower having an outlet for vapor, a liquid stock supply line, pumping means in the liquid stock supply line, said supply line having two branches, one of said branches communicating with said tower at a lower level, means for heating the stock supplied through said lower level branch, the second of said branches communicating with said tower at a higher level, packing material in said tower extending between said lower and higher levels, a heater in the second of said branches, a steam supply line communicating with said heater, a valve in said steam supply line controlling flow therethrough, a float in said evaporating tower disposed to float at substantially the liquid level from a level lower than to a level higher than a desired liquid level, and transmission means between said valve in said steam supply line and said float disposed so that movement of said float upwardly opens said valve in said steam line whereby the liquid level in said tower will be maintained substantially at said desired level by evaporation.

4. Apparatus of the class described comprising in combination an evaporating tower having an outlet for vapor, means to heat said tower, a liquid stock supply line, pumping means in the liquid stock supply line, said supply line having two branches, a valve in each branch controlling flow therethrough, one of said branches communicating with said tower at a lower level, the second of said branches communicating with said tower at a higher level, a heater in the second of said branches, a steam supply line communicating with said heater, a valve in said steam supply line controlling flow therethrough, a float in said evaporating tower disposed to float at substantially the liquid level from a level lower than to a level higher than a desired liquid level, and transmission means between said valve in said steam supply line and said float disposed so that movement of said float upwardly opens said valve in said steam line whereby the liquid level in said tower will be maintained substantially at said desired level by evaporation.

5. Apparatus of the class described comprising in combination an evaporating tower having an outlet for vapor, a liquid stock supply line, said supply line having two branches, one of said branches communicating with said tower at a lower level, the second of said branches communicating with said tower at a higher level, a heater in the second of said branches, a steam supply line communicating with said heater, a valve in said steam supply line controlling flow therethrough, a float in said evaporating tower disposed to float at substantially the liquid level from a level lower than to a level higher than a desired liquid level, and transmission means between said valve in said steam suply line and said float disposed so that movement of said float upwarly opens said valve in said steam line whereby the liquid level in said tower will be maintained substantially at said desired level by evaporation.

6. Apparatus of the class described comprising in combination an evaporating tower having an outlet for vapor, means to heat said tower, a liquid stock supply line, said supply line having two branches, one of said branches communicating with said tower at a lower level, the other of said branches communicating with said tower at a higher level, heating means in the second of said branches, a float in said evaporating chamber disposed to float at substantially the liquid level therein from a level lower than to a level higher than a desired level, and means controlled by the position of said float to control the temperature of the heating means in said second branch disposed so that an excessively high liquid level will be reduced to the desired liquid level by increased evaporation due to heating the liquid in said second branch.

7. Apparatus of the class described comprising in combination an evaporating tower, a liquid stock supply line, said supply line having two branches, one of said branches communicating with said tower at a lower level, the other of said branches communicating with said tower at a higher level, heating means in the second of said branches, a float in said evaporating chamber disposed to float at substantially the liquid level therein from a level lower than to a level higher than a desired level, and means controlled by the position of said float to control the temperature of the heating means in said second branch disposed so that an excessively high liquid level will be reduced to the desired liquid level by increased evaporation due to heating the liquid in said second branch.

8. A method of maintaining the liquid level of stock being evaporated in a chamber at substantially a desired level, comprising the steps of feeding a heated stock at a substantially uniform rate to said chamber below but near said desired level, feeding liquid stock at a substantially uniform rate near the bottom of said chamber, the total feed being at a rate substantially equal to the normal rate of evaporation of the stock in the chamber without additional heat and varying the heat content of the stock being fed to said desired level in accordance with changes in the liquid level in said chamber to vary the rate of evaporation of the liquid stock in said chamber near the desired level to keep the level of the liquid stock in the chamber substantially at the desired level.

9. The method of maintaining the level of a liquid column of stock being evaporated in a chamber at substantially a desired level, comprising the steps of feeding a liquid stock in two streams one to the bottom of the chamber at a substantially uniform rate, and the other to the chamber directly into the liquid column near the top thereof at a substantially uniform rate, heating said second stream being fed to said liquid column and varying the heat content of said second stream when the liquid level of said column rises above or falls below said desired level to vary the rate of evaporation of the column near the top thereof so as to keep the liquid level of the column at substantially the desired level.

10. The method of maintaining the liquid level in an evaporating chamber, comprising the steps of feeding the stock to be evaporated near the bottom of said chamber, feeding additional stock to the chamber at a level adjacent but below the desired level, heating said second feed stock and varying the heat content of said second feed stock in accordance with changes in said liquid level to vary the rate of evaporation in said chamber in a direction to maintain the desired level.

JOSEPH E. STORMENT.

REFERENCES CITED

The following references are of record in the file of this patent:

UNITED STATES PATENTS

| Number | Name | Date |
| --- | --- | --- |
| 825,746 | Moffatt | July 10, 1906 |
| 849,210 | Daley et al. | Apr. 2, 1907 |
| 1,737,490 | Beaurienne | Nov. 26, 1929 |
| 1,802,531 | Prichard et al. | Aug. 28, 1931 |
| 1,864,021 | Jack | July 21, 1932 |
| 1,965,052 | Parker | July 3, 1934 |
| 2,090,691 | Mateer et al. | Aug. 24, 1937 |
| 2,170,342 | Bailey | Aug. 22, 1939 |
| 2,211,725 | Bailey et al. | Aug. 13, 1940 |
| 2,223,658 | Bailey | Dec. 3, 1940 |
| 2,277,070 | Carney | Mar. 24, 1942 |
| 2,357,113 | Houghland et al. | Aug. 29, 1944 |
| 2,357,664 | Kraft | Sept. 5, 1944 |
| 2,388,931 | Nelson | Nov. 13, 1945 |

FOREIGN PATENTS

| Number | Country | Date |
| --- | --- | --- |
| 421,124 | Germany | Nov. 6, 1925 |